United States Patent [19]

Monier

[11] Patent Number: 5,742,534
[45] Date of Patent: Apr. 21, 1998

[54] ELECTRONIC CIRCUIT FOR MODULAR COMPUTATION IN A FINITE FIELD

[75] Inventor: Guy Monier, Rognac, France

[73] Assignee: SGS-Thomson Microelectronics, S.A., Gentilly, France

[21] Appl. No.: 531,952

[22] Filed: Sep. 21, 1995

[30] Foreign Application Priority Data

Sep. 21, 1994 [FR] France .................... 94 11420

[51] Int. Cl.⁶ .................................................. G06F 7/72
[52] U.S. Cl. .................................................. 364/746.1
[58] Field of Search ........................... 364/146.1, 754, 364/757

[56] References Cited

U.S. PATENT DOCUMENTS

| | | | |
|---|---|---|---|
| 5,513,133 | 4/1996 | Cressel et al. | 364/754 |
| 5,535,225 | 7/1996 | Mayhew et al. | 364/746.1 |
| 5,602,767 | 2/1997 | Fettweis et al. | 364/746.1 |

FOREIGN PATENT DOCUMENTS

| | | |
|---|---|---|
| 0145533 | 6/1985 | European Pat. Off. . |
| 0531158 | 3/1993 | European Pat. Off. . |
| 0601907 | 6/1994 | European Pat. Off. . |

*Primary Examiner*—David H. Malzahn
*Attorney, Agent, or Firm*—Robert Groover; Betty Formby; Matthew Anderson

[57] ABSTRACT

An electronic computation circuit comprises a multiplication operator with a serial input, a parallel input and a serial output, a first register connected by its output to the parallel input of the operator, a second register connected by its output to the serial input of the operator, a third register and a multiplexing circuit to selectively connect at least one data input terminal and the output of the operator to the inputs of the first, second and third registers, and to produce the output of the electronic multiplication circuit. Application to the operations of multiplication, squaring, exponentiation and modular inversion on a finite field denoted $GF(2^n)$.

34 Claims, 3 Drawing Sheets

ELECTRONIC CIRCUIT FOR MODULAR COMPUTATION IN A FINITE FIELD

CROSS-REFERENCE TO RELATED APPLICATION

This application claims priority from French App'n 94-11420, filed Sep. 21, 1994, which is hereby incorporated by reference. However, the content of the present application is not necessarily identical to that of the priority application.

BACKGROUND AND SUMMARY OF THE INVENTION

The invention relates to an electronic computation circuit. More particularly, it relates to a circuit dedicated to modular computation in a finite field (Galois field) denoted $GF(2^n)$, n being a natural integer, this circuit enabling the performance of multiplication, squaring, exponentiation and modular inversion on numbers encoded in binary mode on n bits.

Conventionally, modular operations on $GF(2^n)$ are used in cryptography for applications such as the authentication of messages, the identification of a user and the exchange of keys. Such exemplary applications are described for example in the French patent application published under No. 2 679 054.

There are commercially available integrated circuits dedicated to such applications. These are, for example, the product referenced ST16CF54 manufactured by SGS-THOMSON MICROELECTRONICS S.A., built around an association of the type comprising a central processing unit and an arithmetic coprocessor and dedicated to modular computation in any field. This product and its data sheet are both hereby incorporated by reference.

The inventor, in the context of computation on $GF(2^n)$, has shown the existence of certain drawbacks in the working of this particular circuit. Indeed, the coprocessor of this circuit, during the processing of modular operations on $GF(2^n)$ in the implementation of a so-called Montgomery computation method, has to know the result of the resolving of an equation of the following type:

$J*N+1=0 \bmod (2^n)$, with N as a known integer encoded on n bits, n being equal to 32 in the ST16CF54 and mod signifying modulo.

In practice, the computation of J is done by a software method by the central processing unit. To do this, the central processing unit carries out a program of instructions memorized in a program memory of the read-only memory type.

This software method has several drawbacks:
the program takes up memory space in this memory,
there is a relatively lengthy and variable performance time of the order of 250 microseconds,
the coprocessor is dependent on the central processing unit for this computation.

SUMMARY OF THE INVENTION

The invention is aimed at overcoming these drawbacks by proposing a wired logic circuit implementing this computation in a shorter constant period of time and independently of the central processing unit, this computation requiring no particular program memorized in the program memory.

Another aim of the invention is to propose a compact circuit capable of working independently of the circuit ST16CF54, hence one that can easily be used for all applications of the type involving modular computation in $GF(2^n)$.

The invention thus proposes an electronic computation circuit comprising:
a multiplication operator with a serial input, a parallel input and a serial output,
a first register having one input and one output, connected by its output to the parallel input of the multiplication operator,
a second register having one input and one output, connected by its output to the serial input of the multiplication operator,
a third register having one input and one output,
a multiplexing circuit to selectively connect at least one data input terminal and the serial output of the multiplication operator to the inputs of the first, second and third registers, and to produce an output of the electronic multiplication circuit.

Advantageously, the registers used will be of the shift register type, all comprising one and the same number n of elementary cells.

BRIEF DESCRIPTION OF THE DRAWING

The disclosed inventions will be described with reference to the accompanying drawings, which show important sample embodiments of the invention and which are incorporated in the specification hereof by reference, wherein.

The invention will be understood more clearly and other specific features and advantages shall appear from the following description of embodiments of the invention, given by way of an indication that in no way restricts the scope of the invention, in conjunction with the appended drawings of which.

DETAILED DESCRIPTION OF THE PREFERRED EMBODIMENTS

Figure 1:
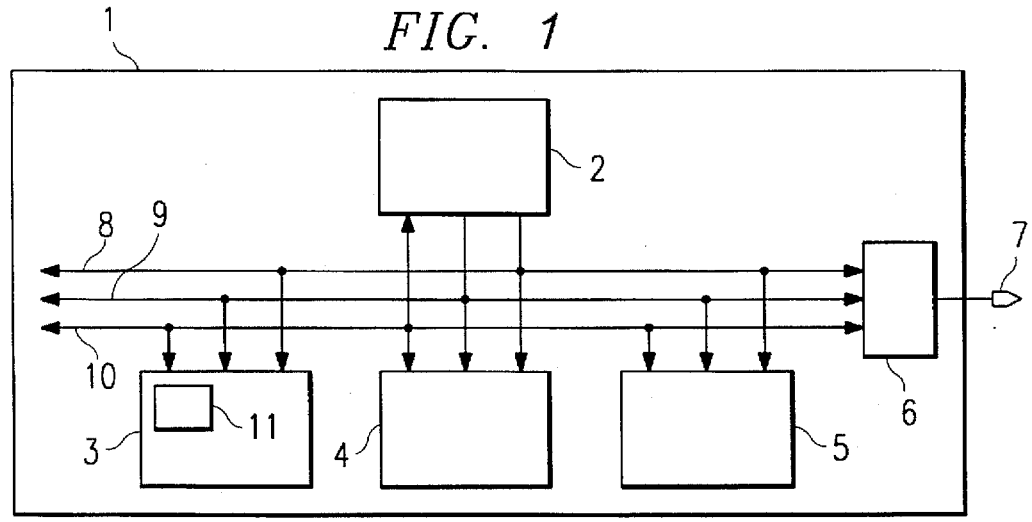
FIG. 1 gives a schematic view of an integrated circuit with an architecture comprising a central processing unit and a coprocessor.

The numerous innovative teachings of the present application will be described with particular reference to the presently preferred embodiment (by way of example, and not of limitation), in which:

FIG. 1 gives a schematic view of a device 1, for example of the integrated circuit type made on a single silicon chip, typically dedicated to the processing of encrypted digital data.

This device 1 has a central processing unit 2 or microprocessor and a set of devices 3, 4, 5, 6 needed for its operation. In one example, it has an arithmetic coprocessor 3, a program memory 4, for example of the read-only memory or ROM type, a data memory 5, and an interface unit 6 to exchange data with its environment by means of inputs/outputs collectively represented by means of a port or access terminal 7. These different devices are connected to the central processing unit by a control bus 8, an address bus 9 and a data bus 10.

This type of architecture is, for example, implemented in the ST16CF54. The coprocessor 3 of the circuit 1 has a circuit 11, made according to the invention.

Figure 2:
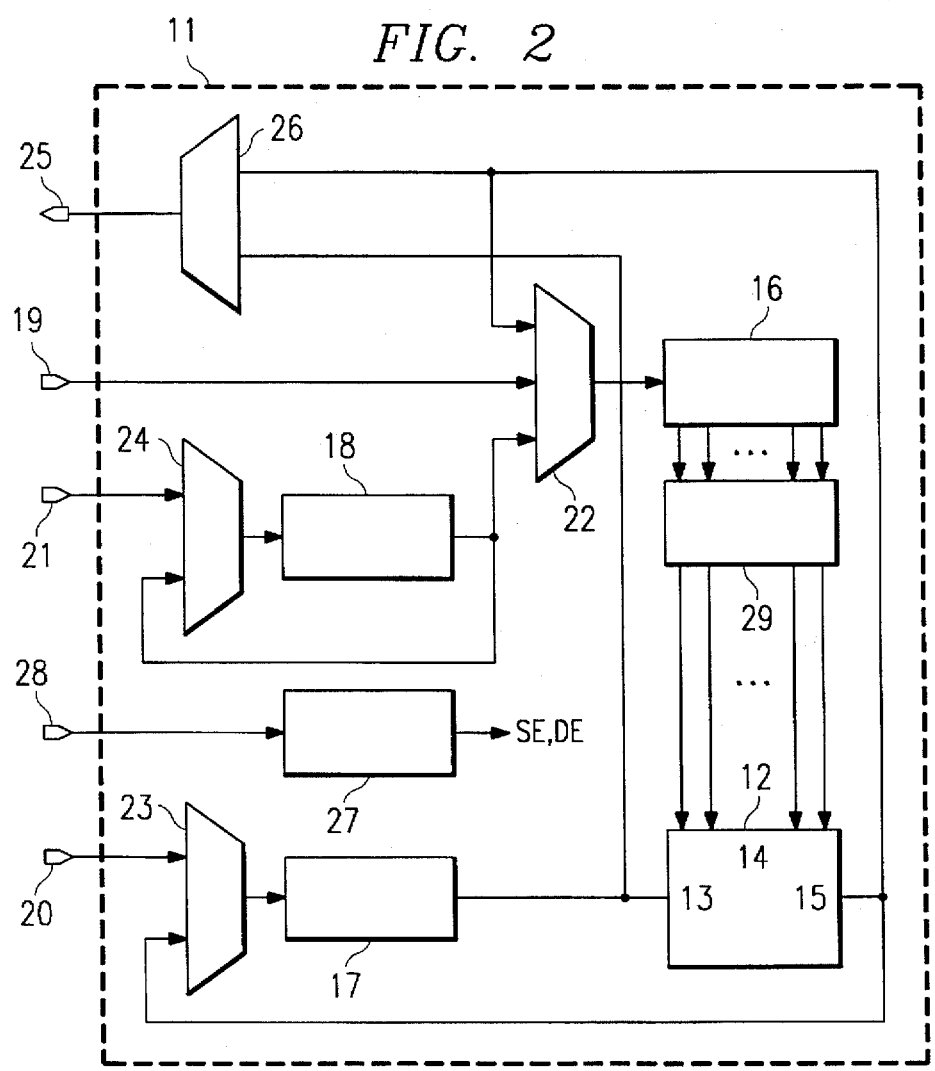
FIGS. 2 and 3 show two embodiments of the invention.

FIG. 2 shows an embodiment of the invention. This FIG. 2 shows a computation circuit 11 comprising:
- a multiplication operator 12 of the series/parallel type with a serial input 13, a parallel input 14 and a serial output 15,
- a first, second and third registers 16, 17 and 18,
- a multiplexing circuit comprising the other elements of the circuit as defined here below: this circuit is not shown as a unit in FIG. 2 for obvious reasons of readability.

The three registers 16, 17 and 18 are of the shift register type and, in the example described, it is assumed that they all have the same number n of elementary cells with n as an integer.

The circuit 11 is arranged so as to enable the performance of modular multiplication, modular squaring, modular exponentiation and modular inversion operations on elements of a finite Galois field with $2^n$ elements encoded in binary mode on n bits, the field being referenced $GF(2^n)$.

To do this, a multiplexer (an element of the multiplexing circuit) is associated with each of the registers to enable the linking of the inputs of these registers with different sources.

The first register 16 has one input to receive a binary data element encoded on n bits, hence a $GF(2^n)$ element, and an output. The input of the first register is a serial input and its output is a parallel output. Thus, to enter the data element into the register, a shift procedure is used. However, the data element will be accessible on n wires, each being connected to a cell of the register.

The second and third registers 17 and 18 are serial input and output registers.

The input of the register 16 is connected to the output of a first multiplexer 22 with three inputs having a first input connected to the output of the multiplication operator, a second input connected to a first data input terminal 19 and a third input connected to the output of the third register 18.

The input of the register 17 is connected to the output of a second two-input multiplexer 23 having a first input connected to the output of the multiplication operator and a second input connected to a second data input terminal 20.

The input of the register 18 is connected to the output of a third two-input multiplexer 24 having a first input connected to a third data input terminal 21 and a second input connected to the output of this third register.

The data input terminals 19, 20 and 21 enable the reception of the numbers, encoded in binary mode on n bits, on which operations of multiplication, squaring, exponentiation or inversion are to be carried out. These terminals could be connected for example to wires of the data bus, outputs of registers or inputs/outputs of the circuit 1.

The circuit 11 also has an output terminal 25 to give the result of an operation carried out on one or more numbers when such an operation is carried out. This result could, for example, be available for the other devices of the circuit 1 by connecting this terminal to a wire of the data bus.

This output terminal is connected to the output of a fourth multiplexer 26 with two inputs having one of its inputs connected to the output of the multiplication operator 12 and its other input connected to the output of a second register 17.

Finally, the circuit 11 has a command input terminal 28 to give selection command signals SE to the multiplexers of the computation circuit and shift command signals DE to the registers (typically by means of a sequencer 27 receiving command signals from the microprocessor 2 by the command input terminal 28).

Although FIG. 1 shows the computation circuit 11 as forming part of the coprocessor 3, it will be understood that it could also have been shown independently.

A description shall be given here below of the use of the circuit for the operations listed here above. Since the operations in question are modular ones, it is only the n least significant bits of the result that are to be taken into account.

Finally, the computation circuit 11 has a storage circuit 29 interposed between the output of the first register 16 and the parallel input of the multiplication operator 12. This storage circuit 29, which is conventionally a latch circuit with n inputs and n outputs, enables the holding, on the parallel input of the operator 12, of stable logic states during multiplication.

Modular Multiplication

Let us take the operation to be performed $C=A*B$ mod $(2^n)$, with A and B as numbers encoded in binary mode on n bits and mod meaning modulo.

C will therefore be encoded in binary mode on n bits.

To compute C, it is enough to carry out the following operations:

1) the selection of the inputs of the multiplexers 22 and 23 so as to connect the inputs of the registers 16 and 17 to the data input terminals 19 and 20, 2) the loading by shifting of the numbers A and B respectively into the first and second registers 16 and 17, 3) the possible selection of different inputs for the second and fourth multiplexers (for example, by connecting the input of the second register to the output of the operator to store the result in the second registers and/or by connecting the data output terminal to the output of this operator to give the results to the exterior of the circuit 11), the shifting of B in the second register so as to successively give the n bits on which B is encoded to the multiplication operator, the n bits encoding C coming out gradually from this operator.

Typically, these different operations are synchronized by a periodic clock signal and the operations of simultaneous changing of the inputs of the multiplexer or for shifting from one cell to another in a shift register taking place during one period or cycle of this clock signal.

Thus, the above steps require the following in terms of time:
- one cycle as regards the step 1),
- n cycles as regards the step 2),
- one cycle as regards the step 3),
- n cycles as regards the step 4), (the computation proper).

Modular Squaring

For the squaring operation, it is enough to carry out a procedure identical to the one described here above by loading the registers 16 and 17 with identical numbers.

Modular Exponentiation

Let us compute $Y=X^E$ mod($2^n$) with X as a number encoded in binary mode on n bits, E as a number encoded in binary mode on any integer 1 of bits $e_0$ to $e_{1-1}$ with $e_0$ as the least significant bit, $e_{1-1}$ as the most significant bit and such that $e_{1-1}$ is 1, and k is the number of bits $e_i$, i ranging from 0 to 1—1 such that $e_i=1$ (k being of course lower than or equal to 1).

To compute Y, it is enough to implement the following algorithm:

Y:=1
For i from 1—1 to 0
If $e_i=0$ then
Y:=Y*Y,
Else
Y:=Y*Y $Y:=X*Y$ $i:=i-1$.

It can thus be seen that:

if $e_i=0$, the algorithm implements a squaring operation, if $e_i=1$, the algorithm implements a squaring operation followed by a multiplication.

To perform the computation of Y, it is enough to carry out the following procedure:

1) the selection of the inputs of the multiplexers 22, 23 and 24 so as to connect the inputs of the registers 16, 17 and 18 to the data input terminals 19, 20 and 21, 2) loading by the shifting of X into the first, second and third registers 16, 17 and 18, for i from 1−2 to 0:

if $e_i=0$ then:

3) the selection of the multiplexers 22 and 23 so as to connect the inputs of the first and second registers to the output of the multiplication operator, 4) the shifting of the contents of the second register into this register so as to successively give the n bits on which its contents are encoded to the multiplication operator, the n bits that gradually come out of this operator and that represent a squaring operation being simultaneously loaded into the first and second registers (at least so long as i>0)

if $e_i=1$ then:

3) the selection of the multiplexers 22 and 23 so as to connect, firstly, the inputs of the first and third register to the output of the third register and, secondly, the input of the second register to the output of the multiplication operator, 4) the shifting of the contents of the second register into this register so as to successively give the n bits on which its contents are encoded to the multiplication operator, the n bits that gradually come out of this operator and represent the result of a squaring operation being simultaneously loaded into the second register (at least so long as i>0) and, at the same time, the shifting of the contents of the third register into this register (by the looping of the output to the input) and into the first register, 5) the selection of the multiplexers 22 and 23 so as to connect the inputs of the first and second registers to the output of the multiplication operator, 6) the shifting of the contents of the second register into this register so as to successively give the n bits on which its contents are encoded to the multiplication operator, the n bits that gradually come out of this operator and represent the result of a squaring operation being simultaneously loaded into the first and second registers 16 and 17 (at least so long as i>0).

Steps 1) and 2) require n+1 cycles to be performed.

The steps 3) and 4) on the one hand and 5) and 6) on the other hand also require n+1 cycles to be performed.

On the whole, the duration of the processing will be m cycles with:

$m=(n+1)+[(1-1)+(k-1)]*(n+1)$, that is $m=(1+k-1)*(n+1)$.

If i=0, the last step will reveal the desired result at output of the multiplication operator.

The utility of the storage circuit 29 appears clearly in the context of exponentiation. Indeed, during the implementation of the above-described method, a serial loading is carried out, in the first register, of the bits during the performance of the multiplication and squaring operations, and there must therefore be a means available to hold the states present at the parallel input of the operator in a stable state during the performance of these operations.

Modular Inversion

The inversion amounts to an exponentiation processed identically to that described here above. Indeed, if we consider Euler's theorem, if the greatest common divisor of N and M (referenced gcd(N,M)), with N and M being integers, is equal to 1 (N and M as prime numbers with respect to each other), then $N\Phi^{(M)}=1 \bmod(M)$ with $\Phi$ as the Euler function.

Now, if $M=2n$, then $\Phi(M)=2^{n-1}$.

In the case of $GF(2^n)$ which is relevant here, assuming therefore that N is encoded on n bits:

either N is an even number and $gcd(N,M)=2^r$, with r as an integer smaller than or equal to n, or N is an odd number and $gcd(N,M)=1$ and according to Euler's theorem, $N^D=1 \bmod(2^n)$ with $D=2^{n-1}$.

Thus, if N is an odd number, we have $N^{-1}=N^E \bmod(2^n)$, with $E=D-1=2^{n-1}-1$.

The modular inversion therefore amounts to an exponentiation with a exponent E such that $l=k=n-1$, with l and k being defined identically to the manner described here above. The computation of the inverse of an odd number will therefore be done in a constant period of m cycles with:

$m=(2*n-3)*(n+1)$ if we take account of the steps 1 and 2 of the exponentiation as defined here above, $m=2*(n-2)*(n+1)$ if the only steps taken into account are the other steps (the computation proper).

Two's Complement Operation

At present, the circuit ST16CF54 by SGS-THOMSON MICROELECTRONICS S.A. uses software methods to resolve the equation $J_0*N_0+1=0 \bmod(2^n)$, with n=32 and N as a known number encoded on n bits. This resolution, as indicated in the introduction, is implemented by the central processing unit of this circuit in an average time of 250 microseconds. During this time, its mathematical coprocessor is stopped. The program used to resolve this equation furthermore takes up 124 bytes of read-only memory.

It will be observed that the resolution of this equation is equivalent to resolving the equation $J_0=-N_0^{-1} \bmod(2^{32})$.

The circuit 11 as described here above enables the computation of $N_0^{-1} \bmod(2^{32})$. If we consider a clock signal with a frequency of 40 MegaHertz (the case of the ST16CF54), this computation requires, apart from the steps 1 and 2, a computation time of 49.5 microseconds and a total processing time (inclusive of the steps 1 and 2) of 50.3 microseconds. Thus, the period of resolution of the equation is reduced by a factor of 5 as compared with the ST16CF54. Given the structure of the circuit 11, which is of a wired logic type, this circuit can be easily integrated into an integrated circuit such as the one designated. Similarly, this circuit could easily be integrated into an existing mathematical coprocessor without any radical modification, given the simplicity of the circuit described. Furthermore, the approach of the invention enables a gain in read-only memory since the resolving of the equation no longer mobilizes the resources of the central processing unit.

It will be noted that although the invention refers to a particular product, it is nonetheless usable in any other circuit whose application pertains to the above-defined operations in a Galois field.

In the context of the ST16CF54, it is sought to resolve the equation $J_0=-N_0^{-1} (\bmod(2^{32}))$. The circuit 11 as described here above enables the computation of $-J_0$. It is possible in a very simple way to provide J0 on the output terminal of this circuit. Indeed, what has to be done then is to carry out a simple two's complementation. For this purpose, it is enough to invert the value of each of the n bits of the result and add 1 (decimal value) to the number thus obtained.

Figure 4:
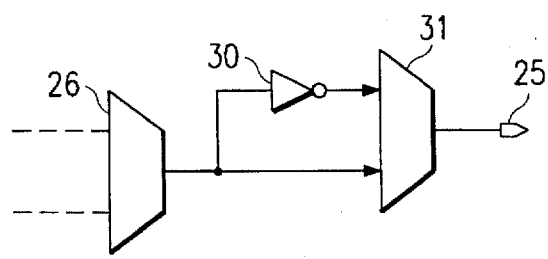
FIGS. 4 and 5 illustrate two exemplary circuits that can be used, in the context of the invention, to obtain the two's complement of the results of the operations that can be performed by the circuit of the invention.
Figure 5:
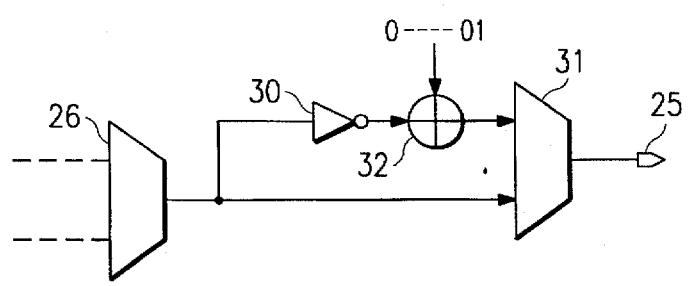

FIGS. 4 and 5 illustrate two ways of carrying out such a complementation.

According to FIG. 4, it is enough to have available an additional two-input multiplexer 31 having its two inputs connected to the output of the multiplexer 26, one of them being connected by an inverter 30, the output of which is connected to the terminal 25. It is then enough, during the output of the least significant bit, to select the input without an inverter and then, during the output of the next n−1 bits, the input with inverter.

According to FIG. 5, between the inverter 30 and the multiplexer 31, there is an addition operator enabling addition of the number 1 (encoded on n bits by a least significant bit at 1 and the n−1 other bits at 0).

It is possible of course to add an additional shift register so as to be capable of storing the value of the result.

Figure 3:
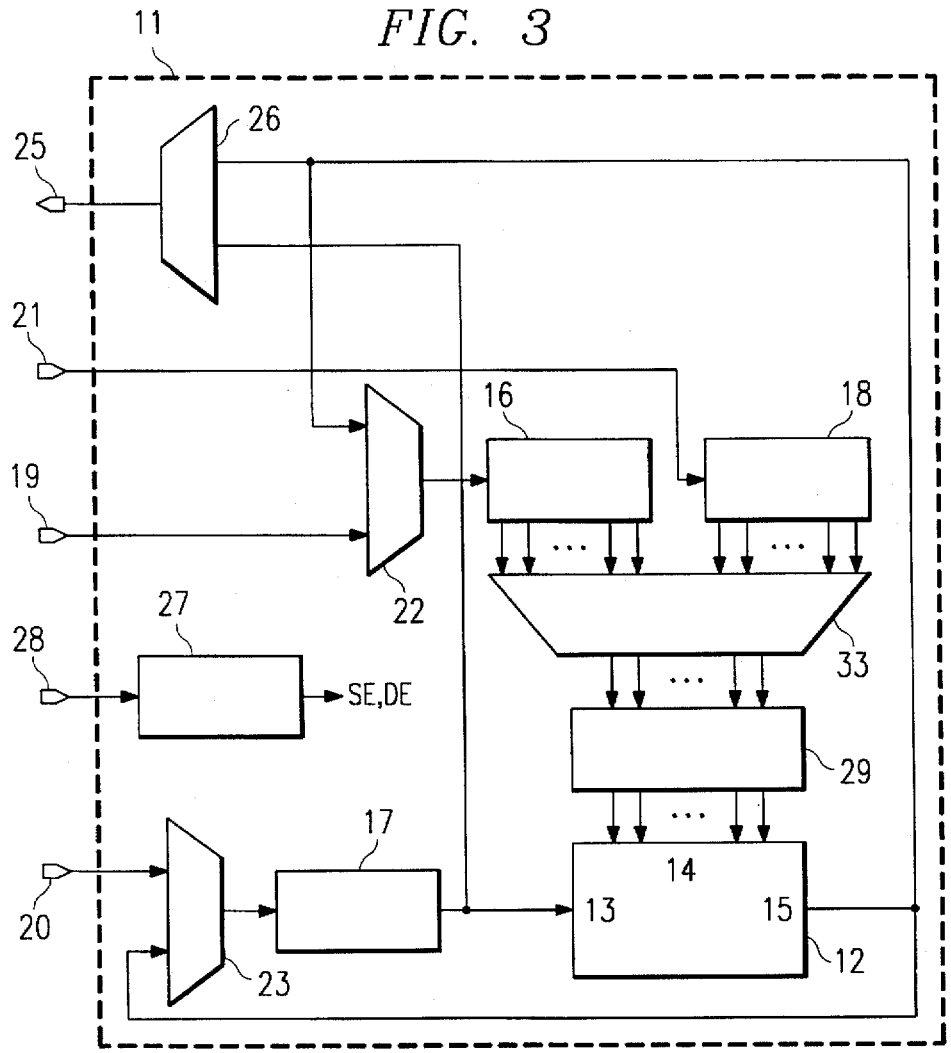

FIG. 3 illustrates another implementation of the invention.

In this embodiment, the data input terminal 21 (repeating the same numbering as for FIG. 2) is directly connected to the input of the third register. Thus, the multiplexer 24 is eliminated. Furthermore, the third register is of the same type as the first one, i.e., with a parallel output, and an additional multiplexer 33 with two parallel inputs and one parallel output is available so as to selectively connect the input of the storage flip-flop circuit 29 either to the output of the first register or to the output of the third register.

It will be observed that the third register is used in the above description solely to store the value of a number on which an exponentiation operation is carried out. It can clearly be seen that it would also be possible to carry out a multiplication of three numbers by storing the third number in this third register.

Furthermore, if it is not desired to make use of this possibility, it is possible to be satisfied with only two data input terminals, one for the first register and the second register and the other for the second register.

Indeed, in the context of the exponentiation and inversion operations as defined here above, the first and third registers are initially loaded with identical data elements.

Although the invention has been described with reference to two given embodiments, it will be understood that these examples are not restrictive and that a wide range of variants may be made without departing from the context of the invention.

It is possible for example to:
load the registers in parallel, which of course would be done to the detriment of the space requirements of the circuit (n input terminals per register) but would enable a reduction of the time taken to load the register by a factor n, the registers furthermore keeping their serial output used in the computation stages,
achieve the serial connection of the three registers at the time of loading if it is desired to reduce the number of ports or access terminals to the circuit. For example, it is possible to eliminate the first and third data input terminal and connect the input of the third multiplexer 24 corresponding to the third input terminal to the output of the second register and eliminate the input of the first multiplexer 22 corresponding to the first input terminal. It is also possible to envisage the use of a second three-input multiplexer so as to enable the connection of the output of the second register to its input, and thus enable the loading of a data element only once from the exterior when it is desired to perform an operation or squaring or exponentiation on this data element.

Figure 6:
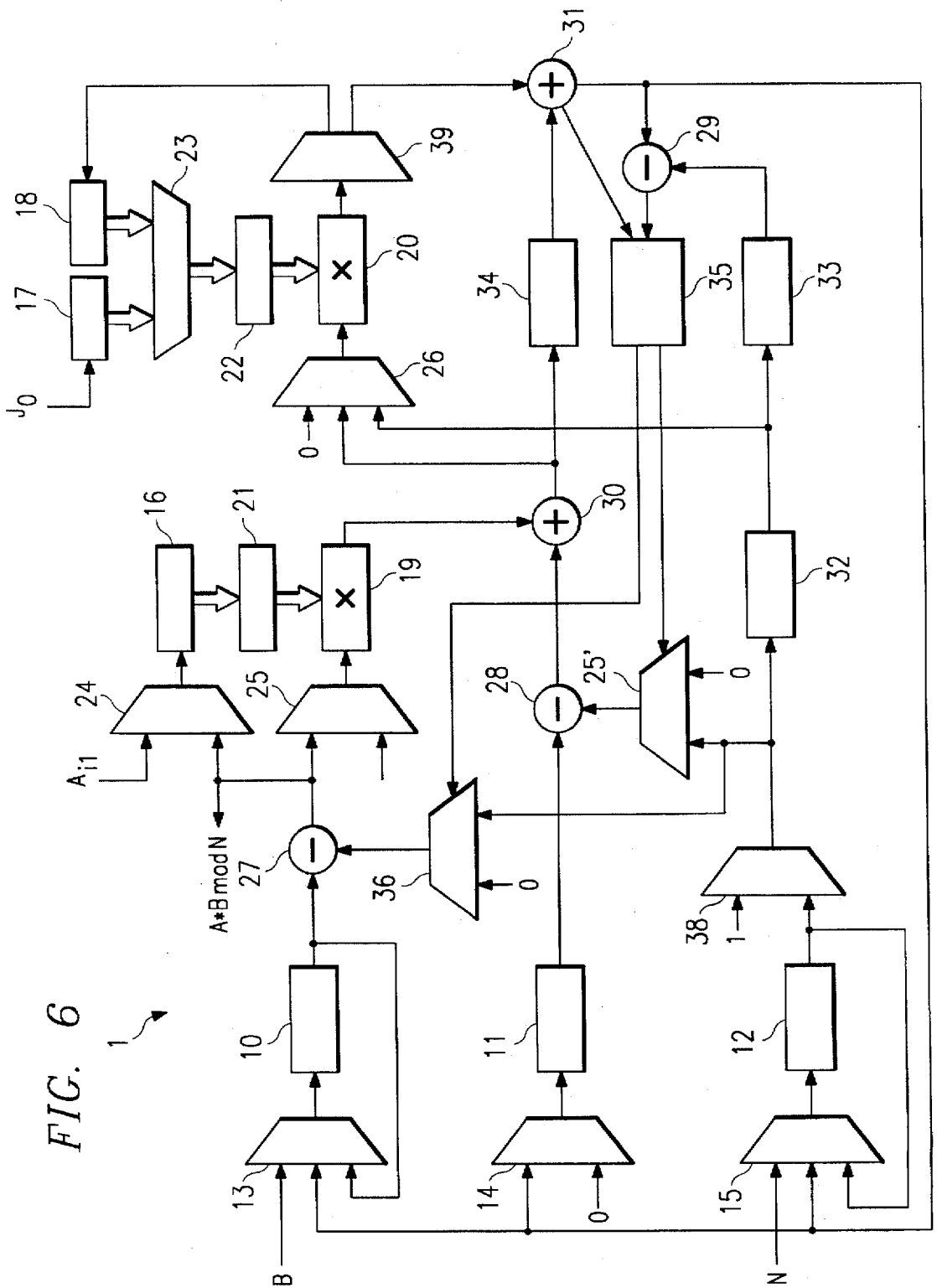
FIG. 6 shows an example of an arithmetic coprocessor which can be used with the innovative computation circuit.

FIG. 6 shows an example of an arithmetic coprocessor which can be used with the innovative computation circuit. This coprocessor uses the term $J_0$ calculated by the circuit of FIGS. 2 or 3.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. An integrated circuit, comprising:
a multiplier having a serial input, a parallel input, and a serial output;
a first register having a serial input, and having a parallel output operatively connected to the parallel input of said multiplier,
a second register having a serial output connected to the serial input of said multiplier,
a first multiplexer which selectably connects said output of said multiplier, or a first externally received data input, to said serial input of said first register; and
a second multiplexer which selectably connects said output of said multiplier, or said serial input of said multiplier, to an external data output terminal.

2. The integrated circuit of claim 1, wherein said parallel input to said multiplier is at least 32 bits wide.

3. The integrated circuit of claim 1, further comprising a sequencer which is connected to operate said multiplexers.

4. The integrated circuit of claim 1, further comprising a sequencer which is connected to receive commands from a command input terminal, and accordingly give selection command signals to said multiplexers and shift command signals to said registers.

5. The integrated circuit of claim 1, further comprising:
a parallel latch interposed between said parallel output of said first register and said parallel input of said multiplier;
a third register having a serial input operatively connected to an external data input, and having a serial output operatively connected to provide another selectable input to said first multiplexer.

6. The integrated circuit of claim 1, further comprising:
a third multiplexer having a first input operatively connected to an external data input, and having a second input, and having an output; and
a third register having a serial input operatively connected to said output of said third multiplexer, and having a serial output operatively connected to said second input of said third multiplexer.

7. The integrated circuit of claim 1, further comprising:
an additional multiplexer having a first input operatively connected to an external data input, and having a second input operatively connected to said output of said multiplier, and having an output operatively connected to provide an input to said second register.

8. An integrated circuit, comprising:
a multiplier having a serial input, a parallel input, and a serial output;

a first register having a serial input, and having a parallel output operatively connected to the parallel input of said multiplier;

a second register having a serial output connected to the serial input of said multiplier;

a first multiplexer which selectably connects said output of said multiplier, or a first externally received data input, to said serial input of said first register;

a second multiplexer which selectably connects said output of said multiplier, or said serial input of said multiplier, to an external data output terminal;

a third multiplexer having a first input operatively connected to an external data input, and having a second input, and having an output; and a third register having a serial input operatively connected to a data input terminal, and having a parallel output operatively connected to said second input of said third multiplexer.

9. The integrated circuit of claim 8, wherein said parallel input to said multiplier is at least 32 bits wide.

10. The integrated circuit of claim 8, further comprising a sequencer which is connected to operate said multiplexers.

11. The integrated circuit of claim 8, further comprising a sequencer which is connected to receive commands from a command input terminal, and accordingly give selection command signals to said multiplexers and shift command signals to said registers.

12. The integrated circuit of claim 8, further comprising:
an additional multiplexer having a first input operatively connected to an external data input, and having a second input operatively connected to said output of said multiplier, and having an output operatively connected to provide an input to said second register.

13. The integrated circuit of claim 8, further comprising: a parallel latch interposed between said parallel output of said first register and said parallel input of said multiplier.

14. An integrated circuit, comprising:
a multiplier having a serial input, a parallel input, and a serial output;

a first register having a serial input, and having a parallel output operatively connected to the parallel input of said multiplier;

a second register having a serial output connected to the serial input of said multiplier;

a first multiplexer which selectably connects said output of said multiplier, or a first externally received data input, to said serial input of said first register;

a second multiplexer which selectably connects said output of said multiplier, or said serial input of said multiplier, to an external data output terminal; and a third multiplexer which is interposed to selectably connect said first register to said parallel input of said multiplier, and also selectably connects a third register to said parallel input of said multiplier.

15. The integrated circuit of claim 14, wherein said parallel input to said multiplier is at least 32 bits wide.

16. The integrated circuit of claim 14, further comprising a sequencer which is connected to operate said multiplexers.

17. The integrated circuit of claim 14, wherein a storage circuit is interposed between said parallel output of said first register and said parallel input of said multiplier.

18. The integrated circuit of claim 14, wherein a fourth multiplexer selectively connects a data input terminal and said serial output of said multiplier to a serial input of said second register.

19. The integrated circuit of claim 14, further comprising a sequencer which is connected to receive commands from a command input terminal, and accordingly give selection command signals to said multiplexers and shift command signals to said registers.

20. An electronic computation circuit, comprising:
a multiplication operator with a serial input, a parallel input and a serial output;

a first register having one input and one output, connected by its output to the parallel input of the multiplication operator;

a second register having one input and one output, connected by its output to the serial input of the multiplication operator;

a third register having one input and one output; and a multiplexing circuit to selectively connect at least one data input terminal and the serial output of the multiplication operator to the inputs of the first and second registers, and to produce an output of the electronic multiplication circuit.

21. A circuit according to claim 20, wherein the multiplexing circuit comprises means to connect the output of the third register firstly to its own input and secondly to the input of the first register.

22. A circuit according to claim 20, wherein the multiplexing circuit has first, second, and third multiplexers, the outputs of which are respectively connected to each of the inputs of the registers.

23. A circuit according to claim 22, comprising a second data input terminal, the first data input terminal being connected to the input of the first multiplexer, the second data input terminal being connected to the input of a second multiplexer.

24. A circuit according to claim 20, wherein the registers are of the shift register type.

25. A circuit according to claim 20, wherein the registers all comprise one and the same number n of cells.

26. A circuit according to claim 20, comprising a storage circuit interposed between the output of the first register and the parallel input of the multiplication operator.

27. A circuit according to claim 20, comprising a storage circuit interposed between, on the one hand, the outputs of the first and third registers and, secondly, the parallel input of the multiplication operator.

28. A circuit according to claim 20, comprising a two's complementation circuit interposed between a multiplexer and a data output terminal.

29. A circuit according to claim 20, wherein a function of said circuit is modular inversion in a finite field of the $GHF(2^n)$ type with n as an integer.

30. A computation method, comprising the steps of:
in a hardware multiplier, multiplying a serial input with a parallel input, and providing a corresponding serial output;

in a first register, shifting in a serial input to provide a corresponding parallel output which is operatively connected to the parallel input of said multiplier;

in a second register, shifting in a serial input to provide a corresponding serial output to the serial input of said multiplier;

in a first multiplexer, selectably connecting said output of said multiplier, or a first externally received data input, to said serial input of said first register; and in a second multiplexer, selectably connecting said output of said multiplier, or said serial input of said multiplier, to an external data output terminal.

31. The method of claim 30, further comprising the steps of:

stabilizing said parallel output of said first register, using a parallel latch; and in a third register, shifting in a serial input which is operatively connected to an external data input, and providing a corresponding serial output which is operatively connected to provide another selectable input to said first multiplexer.

32. The method of claim 30, further comprising the steps of:

in a third multiplexer, receiving a first input which is operatively connected to an external data input, and receiving a second input, and providing one of said inputs as an output in accordance with a selection signal; and a third register having a serial input operatively connected to said output of said third multiplexer, and having a serial output in a third register, shifting in a serial input which is operatively connected to an external data input, and providing a corresponding serial output which is operatively connected to said second input of said third multiplexer.

33. The method of claim 30, further comprising the steps of:

in an additional multiplexer, receiving a first input operatively connected to an external data input, and a second input operatively connected to said output of said multiplier, and providing a corresponding serial output which is operatively connected to provide an input to said second register.

34. An encryption device comprising:

a microprocessor;

a program memory;

a data memory;

an arithmetic coprocessor comprising:

an electronic computation circuit comprising:

a multiplication operator with a serial input, a parallel input and a serial output;

a first register having one input and one output, connected by its output to the parallel input of the multiplication operator;

a second register having one input and one output, connected by its output to the serial input of the multiplication operator;

a third register having one input and one output; and a multiplexing circuit to selectively connect at least one data input terminal and the serial output of the multiplication operator to the inputs of the first and second registers, and to produce an output of the electronic multiplication circuit; and an interface unit;

wherein the microprocessor produces command signals for the multiplexing circuit.

* * * * *